United States Patent [19]

Van Dijk

[11] 4,330,880
[45] May 18, 1982

[54] APPARATUS FOR OPTICALLY READING A DISC-SHAPED RECORD CARRIER, IN PARTICULAR FOR RAPIDLY LOCATING A DESIRED PROGRAM SECTION

[75] Inventor: Ate Van Dijk, Eindhoven, Netherlands

[73] Assignee: U.S. Philips Corporation, New York, N.Y.

[21] Appl. No.: 163,769

[22] Filed: Jun. 27, 1980

Related U.S. Application Data

[63] Continuation of Ser. No. 20,375, Mar. 14, 1979, abandoned.

[30] Foreign Application Priority Data

Dec. 13, 1978 [NL] Netherlands ............................ 7812111

[51] Int. Cl.³ ............................ H04N 5/84; G11B 7/00
[52] U.S. Cl. ............................ 369/32; 250/201; 369/33; 369/44
[58] Field of Search ............................ 250/201–204; 360/10, 11, 38, 77, 78; 365/215, 234; 358/128.5, 128.6; 369/30, 32, 33, 44, 55, 56, 57, 111, 124, 220, 221

[56] References Cited

U.S. PATENT DOCUMENTS

| Re. 29,963 | 4/1979 | Janssen | 358/128.6 |
| 3,854,015 | 12/1974 | Janssen | 358/128.6 |
| 4,037,252 | 7/1977 | Janssen | 369/46 |
| 4,142,209 | 2/1979 | Hedlund et al. | 358/128.6 |
| 4,236,232 | 11/1980 | Jansen et al. | 365/234 |

Primary Examiner—Bernard Konick
Assistant Examiner—Donald McElheny, Jr.
Attorney, Agent, or Firm—Thomas A. Briody; Robert T. Mayer; Algy Tamoshunas

[57] ABSTRACT

An optical read apparatus for a disc-shaped record carrier. The read apparatus comprises an optical read unit which includes a deflection element for controlling the radial position of the scanning spot, for which purpose said deflection element is included in a closed servo control loop. In order to enable a desired program section on the record carrier to be located rapidly, the read unit can be moved in the radial direction. During this movement of the read unit the servo control loop is rendered inoperative each time after the deflection element has reached a preset maximum deflection, after which this deflection element is reset rapidly and the servo control loop is rendered operative again. Thus it is achieved that image reproduction is also maintained during the rapid search for a desired program section.

8 Claims, 6 Drawing Figures

APPARATUS FOR OPTICALLY READING A DISC-SHAPED RECORD CARRIER, IN PARTICULAR FOR RAPIDLY LOCATING A DESIRED PROGRAM SECTION

This is a continuation, of application Ser. No. 020,375, filed Mar. 14, 1979, now abandoned.

BRIEF SUMMARY OF THE INVENTION

The invention relates to an apparatus for reading a disc-shaped record carrier on which video information is recorded in accordance with an optically detectable structure in substantially parallel tracks. The apparatus is provided with an optical read unit having a radiation source for emitting a read beam of radiation, a read detector for detecting the information contained in the read beam of radiation after cooperation with the record carrier, and a deflection element which cooperates with the read beam of radiation, for varying the radial scanning position on the record carrier. The deflection element comprises an element which depending on a control signal is movable from a center position in two opposite directions, the apparatus furthermore being provided with drive means for radially moving the optical read unit and a servo-control loop for controlling the radial scanning position. The loop includes the deflection element and a measuring detector for measuring the deviation of the radial scanning position relative to the desired track and deriving therefrom the control signal for the deflection element.

Disc-shaped record carriers with an optically detectable structure are eminently suitable for the storage of video signals. Because reading is effected in a contactless manner, i.e. there is no mechanical contact between the record carrier and the read unit, the radial scanning position of the record carrier may be changed freely without the risk of damage. This inter alia provides the possibility of realizing stand-still and slow-motion modes of reproduction.

An apparatus of the afore-mentioned type is known from the U.S. Pat. No. 3,854,015, which Patent specifically describes the steps for realizing the said scanning modes. By means of these steps it is achieved that at instants dictated by the desired scanning mode the radial scanning position on the record carrier is shifted one track distance.

In addition to this possibility of realizing said scanning modes, the contactless read-out inherent in the optical read system also enables the rapid search for a desired program section on the record carrier. Indeed, by radially moving the optical read element, any desired program section of the video information recorded on the record carrier can rapidly be brought within the scanning range of said read unit.

When searching for a specific desired programme section it is desirable that during the radial movement the read unit is capable of reading video information in an optimum manner, i.e. that image reproduction is maintained in an optimum manner. Indeed, when image reproduction is preserved the effective location of a desired program section is greatly simplified.

It is an object of the invention to provide an apparatus of the type mentioned in the preamble which meets the afore-mentioned requirement by comparatively simple means. To this end the invention is characterized in that the apparatus is provided with position detection means for supplying a first detection signal as soon as the deflection of the deflection element relative to the center position exceeds a specific predetermined value, first switching means for rendering the servo control loop inoperative upon the appearance of the first detection signal, drive means for causing the deflection element to pass through the center position upon the appearance of the detection signal, and second switching means for subsequently rendering the servo control loop operative again.

The invention makes use of the recognition that when the read unit is moved in a radial direction the scanning spot formed on the record carrier by the read beam nevertheless remains coincident with the information track for some time and read-out of the video information is preserved. This is because the servo-control loop, which comprises the deflection element, tends to make the scanning spot coincide with the information track. This servo-control loop in fact compensates for the radial movement of the scanning spot as a result of the radial movement of the read element through an oppositely directed radial movement, caused by the movement dictated by the deflection element included in the servo-control loop. The deflection of the deflection element will then increase continually. In accordance with the invention the servo control loop is rendered inoperative when a preset maximum deflection of the deflection element is attained and this deflection element is driven past the central position to a position which, with the center position as reference, is at the most the approximate mirror-image of the position occupied originally. Subsequently the servo-control loop is rendered operative, so that the scanning spot again coincide with the information track for some time, namely until said preset maximum deflection of the deflection element is reached again. The preset maximum deflection of the deflection element is then selected in such a way that a correct read-out of the record carrier is still possible at this deflection. The steps in accordance with the invention ensure that during the search for a specific program section read-out is maintained for comparatively long time intervals (for example, 100 msecs) while said time intervals alternate with comparatively short time intervals (for example 10 msecs) in which no reading is performed, so that during the search for a desired program section a virtually undisturbed image reproduction is achieved.

A preferred embodiment of the apparatus in accordance with the invention is characterized in that the deflection element comprises an element which in response to the control signal can be moved out of the center position against a spring force, that the drive means are constituted by said spring force, and that the apparatus is provided with speed detection means for supplying a second detection signal as soon as the radial speed of movement of the scanning position has decreased below a specific predetermined value, and the second switching means are adapted to render the servo-control loop operative again upon the appearance of said second detection signal. This preferred embodiment of the apparatus in accordance with the invention makes effective use of the property of a commonly used type of deflection element. This deflection element for example comprises a mirror which is pivotable with the aid of a galvanometer drive, said mirror normally being held in its center position by a spring. When upon reaching the preset maximum deflection of the mirror the servo-control loop is rendered inoperative, this mirror will perform an oscillatory movement as a result of the spring force. As during the reversal of the direction of movement (maximum deflection) the speed of movement is zero, this speed of movement is a highly suitable criterion for rendering the servo-control loop operative again.

In accordance with a further preferred embodiment the speed detection means are coupled to the measuring detector and are adapted to measure the frequency of an a.c. signal supplied by said measuring detector and to supply the second detection signal as soon as said frequency has decreased below a specific limit value.

In order to further reduce the time during which no read-out of information is possible, a preferred embodiment of the invention is characterized in that the drive means comprises a control circuit for supplying a control signal to the deflection element for driving said deflection element upon the appearance of the first detection signal. Thus, the use of a spring-force deflection element-boosts the drive as a result of the spring force. When a deflection element without spring constant is employed this active drive is even necessary. The shape of the control signal then obviously depends of the type of element. In general, the control signal will be given such a shape that upon termination of said control signal the deflection element has a maximum deflection and moreover the speed of movement is minimal, because in that case locking into a track is simplest via the servo control loop which is then closed.

In order to simplify this locking-in of the servo-control loop to a track, a further preferred embodiment of the invention is characterized in that the apparatus is provided with control means for braking, if necessary, the movement of the deflection element after the servo-control loop has been rendered operative again.

The invention will now be described in more detail with reference to the Figures, of which

DETAILED DESCRIPTION OF THE PREFERRED EMBODIMENTS

Figure 1:
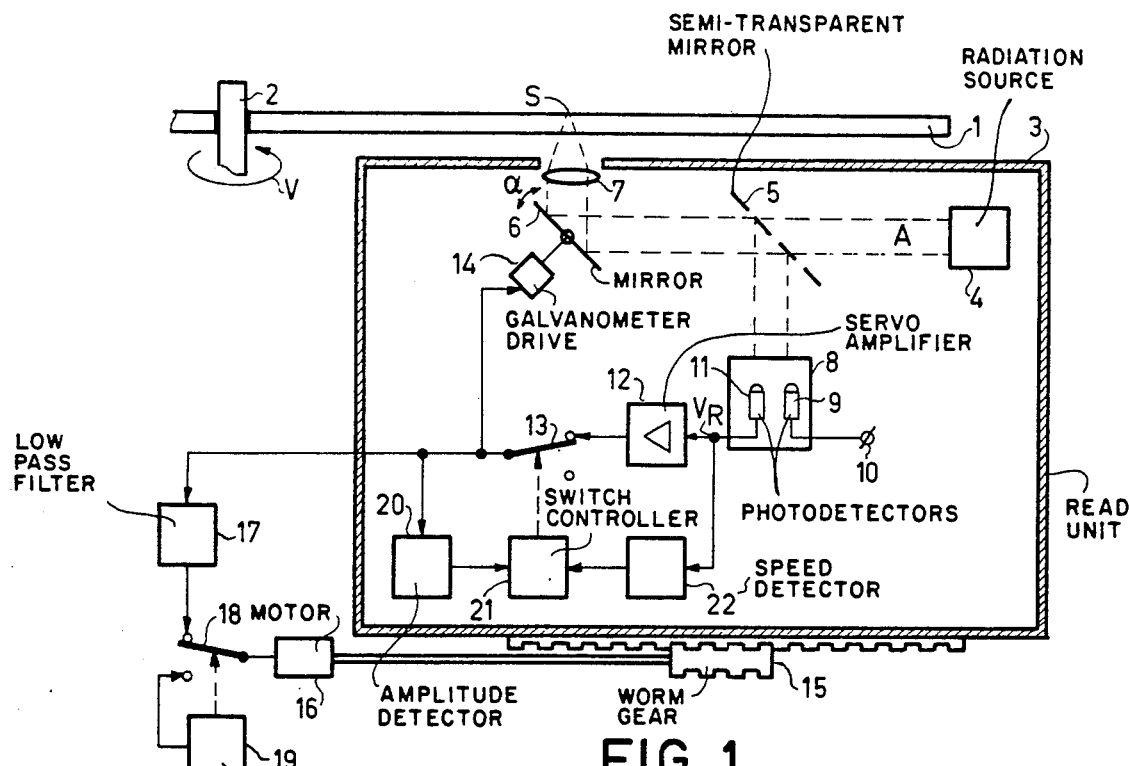
FIG. 1 schematically shows an embodiment of the apparatus in accordance with the invention.

FIG. 1 shows a disc-shaped record carrier 1, which can be rotated in a direction V by means of a spindle 2 which extends through a central opening. It has been assumed that this record carrier has information tracks on the upper surface, which upper surface is reflecting, and that the record carrier material itself is transparent, so that the information tracks of this record carrier can be read through the transparent record carrier material with the aid of an optical read-unit which is disposed underneath the record carrier.

This optical read-unit is accommodated in a housing 3 and first of all comprises a radiation source 4, which produces a read beam of radiation A. This read beam A is directed to the record carrier via a semi-transparent mirror 5, a deflection element 6 in the form of a mirror, and a lens system 7 and is focused to a scanning spot S by said lens system 7. The radiation beam which is reflected by the record carrier is subsequently returned to a detection system 8 via the lens system 7, the mirror 6, and the semi-transparent mirror 5. This detection system 8 is only shown schematically and comprises a read detector 9 for detecting the video information contained in the read beam, which video information is available for further processing on a signal terminal 10.

Furthermore this detection system 8 comprises a measuring detector 11 for measuring the deviation of the radial position of the scanning spot S relative to the desired track. The error signal supplied by this measuring detector 11 is applied to a drive means 14 via a servo amplifier 12 and the switch 13, which normally is in the position shown, which drive means 14 determines the angular position $\alpha$ of the mirror 6. This drive means 14 may for example be constituted by a galvanometer drive, a number of windings being arranged on the mirror, which windings are disposed in a magnetic field, so that the angular position of the mirror is variable against a spring force by the application of a current to said windings. Thus, via the read beam A, the measuring detector 11, the servo amplifier 12, the drive means 14 and the mirror 6 a closed servo control loop is obtained, which ensures that the scanning spot S always coincides with the information track.

The housing 3 accommodating the optical read unit can be moved in a radial direction by means of a worm gearrack combination 15, which is driven by a motor 16. This motor 16 receives a control signal which is derived from the control signal for the drive means 14 via for example a low-pass filter 17. Thus during normal scanning of the record carrier 17 the radial position of the read unit is corrected automatically depending on the average deflection of the mirror 6.

The apparatus is described so far entirely corresponds to the apparatus as described in the said U.S. Pat. No. 3,854,015 incorporated by reference. Said Patent also describes some possibilities of obtaining a suitable control signal in the servo control loop with the aid of the measuring detector 11 and alternative constructions for the drive means 14. As the method in which said control signal is obtained is not essential for the present invention and moreover a variety of solutions are known for this from the literature, as will not be discussed in more detail.

In order to enable the rapid search of a desired program section a switch 18 is included between the filter 17 and the motor 16, which switch normally occupies the position shown. During the rapid search for a desired program section the switch 18 is changed over with the aid of an actuating unit 19, so that the motor 16 no longer receives a control signal from the filter 17. Via the actuating unit 19 and the switch 18 such a control signal is then applied to the motor 16 that the read unit is moved in the desired direction, for example with a constant speed.

As initially the radial servo control loop is still operative, this servo control loop will attempt to keep the scanning spot S directed at the information track. This means that through a continuously increasing deflection the mirror 6 attempts to compensate for the radial movement of the scanning spot S caused by the movement of the read unit 3. Consequently, the deflection $\alpha$ of said mirror 6 will increase continuously, as is indicated in the time interval $t_0-t$ in FIG. 2a, the influence of the eccentricity of the record carrier on the mirror deflection being ignored.

In accordance with the invention the servo control loop is rendered inoperative when a specific predetermined value $\alpha_M$ of said deflection is reached. For this purpose the apparatus comprises a detector for determining the instant at which said limit value $\alpha_M$ of the deflection of the mirror 6 is reached. Assuming that a mirror 6 is used which is driven by the drive means 14 against spring force, the control signal for the drive means 14 can be measured, because said control signal is then proportional to the deflection $\alpha$ of the mirror. In the embodiment shown this control signal is therefore applied to the detector 20, which when said control signal exceeds a preset threshold value supplies a first detection signal to a control device 21. It is obvious that as an alternative the mirror 6 may be provided with a measuring system which supplies a signal proportional to the deflection $\alpha$ and this signal may be applied to the detector 20.

The control device 21 controls the switch 13 and in response to the first detection signal sets this switch 13 to the position not shown, so that the radial servo control loop is interrupted and is no longer operative. Instead of a switch 13 any other suitable manner of making the servo loop in operative can be used of course. As a result of this the drive means 14 no longer receives a control signal and from this instant $t_1$ the mirror 6 performs a free oscillation caused by the obtaining spring force. Without any further steps the mirror 6 would perform a damped oscillation about the center position, as is shown dotted in FIG. 2a. However the apparatus in accordance with the invention includes provisions which ensure that after the first half oscillation period, i.e. at the instant $t_3$, the servo control loop is closed again and thus the radial scanning position is kept coincident with the information track again.

When a mirror drive with spring element is used, as has been assumed for the apparatus of FIG. 1, the apparatus for this purpose comprises a speed detector 22, which supplies a second detection signal to the control device 21 as soon as the speed of movement of the mirror decreases below a specific preset threshold value. For obtaining a signal which is representative of said speed of movement of the mirror use can simply be made of the properties of the radial position measuring systems commonly used in these optical read systems, i.e. the measuring detector 11 and the associated system. These measuring systems supply a signal which is representative of the positional deviation of the scanning spot relative to the nearest track. This means that if the scanning spot is radially moved over a number of track distances, the measuring detector 11 supplies a period output signal, which is sinusoidal, the period of the signal being determined by the track distance and the speed of the radial movement. For a further discussion of this property of the optical measuring systems, reference is made to U.S. Pat. No. 4,037,252.

Figure 2:
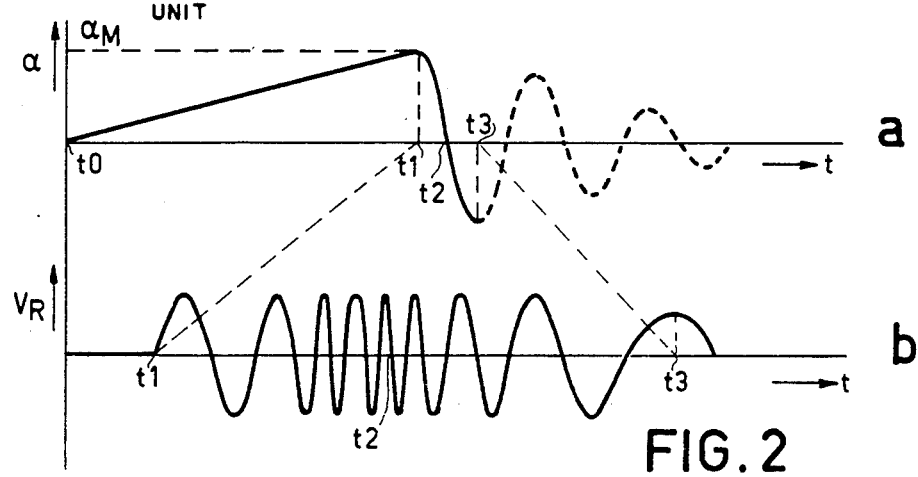
FIG. 2 shows some characteristics by way of illustration, and FIG. 3 schematically illustrates the effect of the steps in accordance with the invention.

The invention utilizes this property of the measuring system by applying the output signal $V_R$ of the measuring detector 11 to the speed detector 22, for the period of said output signal is a measure of the radial speed of movement of the scanning spot. At the instant $t_1$ this speed of movement is virtually zero and subsequently it increases rapidly until at the instant $t_2$ the mirror passes through the center position, after which the speed of movement decreases again. At the instant $t_3$, at which as a result of the combined effect of the movements of the read unit 3 and the mirror 6 the radial direction of movement of the scanning spot S is reversed, the speed will briefly be zero. FIG. 2b schematically and on an enlarged scale represents the variation of the measuring signal from the measuring detector 11 for the time interval $t_1-t_3$. In conformity with the foregoing the frequency of this signal $V_R$ will increase from the instant $t_1$ till the instant $t_2$ and will subsequently decrease again. By measuring this frequency, which may for example be realized by measuring the intervals between the zero passages, an indication is obtained in respect of the radial speed of movement of the scanning spot. If the interval between two consecutive zero passages has exceeded a specific preset limit value (instant $t_3$), i.e. if the speed of movement has decreased below a specific limit value, the speed detector 22 supplies a second detection signal to the control device 21, which in response thereto resets the switch 13 to the position shown and renders the servo control loop operative again. After this instant $t_3$ the servo control loop will keep the scanning spot again at the information track until the mirror deflection again exceeds the preset maximum value, after which the process described in the foregoing is repeated.

In order to explain the process described in the foregoing FIG. 3 again illustrates said process schematically. In this Figure T designates a part of a number of parallel tracks on the record carrier 1, i.e. a radial cross-section of the information surface of the record carrier. The reference numeral 3 designates the read unit, in particular the radial position of this read unit, and A symbolically indicates the direction of the read beam as dictated by the mirror 6. At the instant $t_0$ the read unit is in the position shown, while the mirror 6 approximately occupies its center position. In the time interval $t_0-t_1$ the read unit 3 moves in accordance with the dashed arrow $P_1$. At the same time the mirror 6 is tilted in such a way that the scanning spot keeps cooperating with the original information track until at the instant $t_1$ said mirror has reached its maximum deflection. At this instant $t_1$ the mirror 6, in the time interval $t_2-t_3$, is rapidly given a deflection in accordance with the dashed arrow $P_2$ and shown at $t_3$. As is apparent from the Figure, the deflections at the instants $t_1$ and $t_3$ are disposed substantially symmetrically relative to the center position of the mirror. Furthermore it is to be noted that the movement of the read unit 3 performed in the time interval $t_1-t_3$ is not shown for the sake of simplicity. At this instant $t_3$ the servo control loop is closed again, so that during the subsequent movement of the read unit 3 (dashed arrow $P_3$) the scanning spot remains directed at the information track by a compensating pivotal movement of the mirror 6 until at the instant $t_4$ this mirror has again reached its maximum deflection and is then rapidly tilted again in accordance with the dashed arrow $P_4$.

Thus, the steps in accordance with the invention ensure that when searching for a desired program section the scanning spot S remains directed at the information track during time intervals corresponding to the time interval $t_3-t_4=2(t_0-t_1)$, while these intervals are interrupted only for comparatively short interruption intervals corresponding to the interval $t_1-t_3$, in which no reading is effected. The ratio between the length of the two intervals obviously depends on the various system parameters. As an example, the magnitude of the time interval $t_3-t_4$ is determined by the maximum permissible deflection of the mirror 6, in which the magnitude of the so-called aperture of the lens system 7 plays a part. The magnitude of the time interval $t_1-t_3$ is determined by the magnitude of the displacement of mirror in this time interval and the speed of this movement. It has been found that 100 msecs. is readily attainable for the interval $t_3-t_4$ and 10 msecs. for the time interval $t_1-t_2$. In that case each time approximately 3 video pictures (NTSC) are read, after which this read-out is interrupted for 10 msecs only, which is amply sufficient for the reproduction of satisfactorily identifiable pictures.

Figure 4:
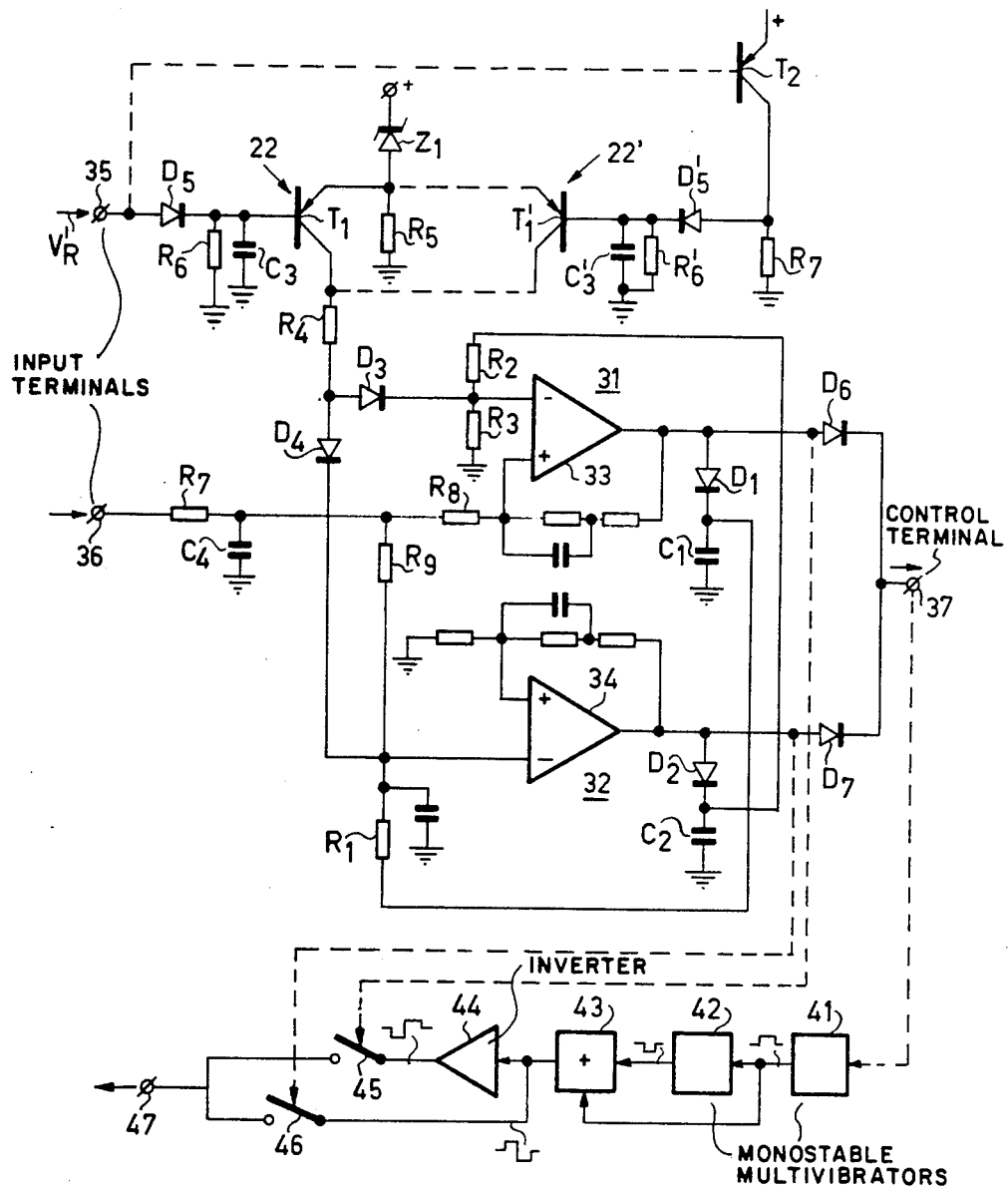
FIG. 4 shows an example of the circuits required in the apparatus in accordance with the invention.

FIG. 4 in more detailed form shows an example of the detectors 20 and 22 and the control device 21 as used in the apparatus of FIG. 1. The circuit comprises two bistable multivibrators 31 and 32, which each comprise a differential amplifier 33 and 34 respectively and an RC feedback network between the output and the positive input of each of said differential amplifiers. The outputs of the two bistables 31 and 32 are individually connected to ground via the series connection of a diode and a capacitance $D_1$, $C_1$ and $D_2$, $C_2$ respectively. Furthermore, the connecting point between the diode $D_1$ and the capacitance $C_1$ is connected to the inverting input of the differential amplifier 34 via a resistor $R_1$, while the connecting point between the diode $D_2$ and the capacitance $C_2$ connected to the inverting input of the differential amplifier 33 via a resistor $R_2$. The inverting inputs of the differential amplifiers 33 and 34 are furthermore connected to a resistor $R_4$ via two diodes $D_3$ and $D_4$ respectively, which resistor $R_4$ in its turn is connected to the collector of a pnp-transistor $T_1$. The emitter of this transistor $T_1$ is maintained at a fixed potential with the aid of a zener diode $Z_1$ and a resistor $R_5$. To an input terminal 35 a signal $V_R'$ is applied, which is derived from the measuring signal $V_R$, which has been converted into a squarewave signal by amplification. Said input terminal 35 is connected to the base of said transistor $T_1$ via a diode $D_5$ in forward direction, which transistor base is also connected to ground via the parallel connection of a resistor $R_6$ and a capacitance $C_3$. The combination of the diode $D_5$, resistor $R_6$, capacitance $C_3$ and transistor $T_1$ then functions as speed detector 22.

Normally the two bistables 31 and 32 will be in a state in which their output signals are negative. Should one of the bistables be in the other state, for example when the apparatus is put into operation, the servo control loop is interrupted. The mirror is then in a rest position. Because of the inevitable eccentricity of the record carrier the scanning spot will then move to and fro over a number of tracks in the radial direction. This means that the square-wave signal $V_R'$ on the input terminal 35 has a comparatively low frequency. During the negative halfcycle of said signal $V_R'$ the capacitance $C_3$ is therefore discharged so far that transistor $T_1$ is turned on, so that the two bistables 31 and 32 are set to the state in which they supply a negative output voltage. Via the RC feedback network and non-inverting inputs of the two differential amplifiers 33 and 34 then receive a reference voltage derived from their output voltages.

An input terminal 36 receives the control signal from the mirror 6 and consequently functions as an input of the position detector 20 (FIG. 1). This input terminal 36 is connected to resistors $R_8$ and $R_9$ via a low-pass filter $R_7$, $C_4$, which resistors in their turn are connected to the noninverting input of the differential amplifier 33 and the inverting input of the differential amplifier 34 respectively. If the voltage on the input terminal exceeds a specific positive threshold value, the bistable 31 will change over via the resistor $R_8$ and its output will become positive. However, if the voltage on the input terminal 36 decreases below a certain negative threshold value, the bistable 32 will change over via the resistor $R_9$ and its output will become positive. The two bistables 31 and 32 thus function as position detectors for detecting a preset maximum deflection of the mirror 6 (FIG. 1). In order to obtain a suitable control signal for the switch 13 in the servo control loop (FIG. 1) the outputs of the two bistables 31 and 32 are connected to a control terminal 37 via diodes $D_6$ and $D_7$, on which control terminal the control signal for the switch 13 is available. As soon as the voltage on the input terminal 36 exceeds a preset threshold value in an absolute sense, one of the bistables 31 and 32 will change over and assume a positive output voltage so that via the control terminal 37 the switch 13 is changed over and the servo control loop is rendered inoperative.

As the mirror is then tilted rapidly, the signal which is applied to the input terminal 35 will have a shape corresponding to $V_R$ in the time interval $t_1-t_3$, said signal first being converted into a squarewave signal. Owing to the presence of the diode the voltage across the capacitance $C_3$ will follow the positive halfcycles of said input signal, while during the negative halfcycles this capacitance $C_3$ will be discharged. As long as the frequency of the signal $V_R$ is high the voltage across this capacitance $C_3$ will therefore remain comparatively high, so that the transistor $T_1$ remains cut off. Only when the frequency of the signal $V_R$ has decreased below a specific limit value, i.e. the length of a negative half-cycle exceeds a certain limit value, can the capacitance $C_3$ be discharged so far that transistor $T_1$ is turned on. As a result of this the bistable which in the state with a positive output voltage is reset to the state with a negative output voltage, so that the control voltage on the control terminal 37 also becomes zero again and the servo control loop is closed again. Thus in the circuit shown said limit value for the frequency of the signal $V_R$ is determined by the voltage on the emitter of the transistor $T_1$, the values of the capacitance $C_3$ and resistor $R_6$, and the amplitude of the squarewave signal on the input 35.

FIG. 2b shows that immediately after the servo control loop has opened (instant $t_1$) the frequency of the signal $V_R$ is still low. This may lead to an erroneous behavior, because the speed detector 22 may respond thereto and may energize the bistables 31 and 32 in order to close the servo control loop. It is obvious that this can be avoided by applying the signal $V_R$ to the input terminal 35 via a gate circuit and by ensuring that this gate circuit is not opened until a certain time after the instant $t_1$. In the circuit arrangement of FIG. 4 this problem is avoided in a simple manner by the presence of the capacitances in the individual feedback circuits of the differential amplifiers 33 and 34. If the mirror control signal on input terminal 36 has changed over one of the bistables, i.e. if the value of its output voltage becomes positive, the threshold value of the relevant bistable briefly assumes an extra high value at this instant. This value is so high that a signal from the speed detector 22 is not capable of resetting said bistable. The threshold value of the relevant bistable does not assume the desired value until the capacitance in the feedback circuit of this bistable has been charged, i.e. a specific time after the instant $t_1$.

If after reaching the maximum permissible deflection of the mirror the servo control loop has been rendered inoperative and the mirror has passed through its center position, the servo control loop will be rendered operative again at an instant that this mirror may have a deflection which rather closely approximates the opposite maximum permissible deflection. As after the servo control loop has closed again the mirror again receives control signals for keeping the scanning spot on the track, it may occur that the maximum permissible deflection of the mirror is immediately exceeded again and the servo control loop is rendered inoperative, which is obviously undesirable. This is prevented by the cross-coupling between the outputs of the bistables 31 and 32 via the respective diode-capacitance combination $D_1C_1$ $D_2C_2$ to the input of the other bistable. If for example as a result of reaching the maximum permissible positive deflection of the mirror the bistable 31 has been set to a positive output voltage, a part of this positive output voltage will reach the input of the bistable 32 via the diode $D_1$, the capacitance $C_1$ and the resistor $R_1$. This means that the threshold value of this bistable has been raised relative to the signal on the terminal 36. This increased threshold voltage remains for a short time after the bistable 31 has been reset by the speed detector 22 after the mirror has passed through the centre position. This means that if immediately afterwards the mirror would exceed the maximum negative deflection the associated signal on terminal 36 is not capable of changing over the bistable 32, so that an undesired closure of the servo control loop is avoided.

For the embodiments of the apparatus in accordance with the invention described so far it has been assumed that after interruption of the servo control loop the deflection element is deflected (the mirror 6 is tilted) solely under the influence of the spring force of this deflection element. If the time necessary for moving the deflection element is to be reduced additionally it is of course possible, after rendering the servo control loop inoperative, to apply an additional control signal to the drive means of said deflection element. A possibility of obtaining a control signal suitable for this purpose is schematically shown in FIG. 4.

The circuit arrangement shown therein comprises a first monostable 41, whose input is connected to the control terminal 37. Consequently this monostable supplies for example a positive pulse of fixed length when the control signal on the control terminal 37 becomes positive, i.e. as soon as the servo control loop is opened. The output of said monostable 41 is connected to the input of a second monostable 42, which is triggered by the negative going edge of the pulse supplied by the monostable 41 and in response thereto supplies a negative pulse. The pulses supplied by the monostables 41 and 42 are added with the aid of the adder circuit 43, which results in a control signal of a symmetrical nature, assuming that the durations of the pulses supplied by the two monostables are the same. This means that when the mirror drive is energized by said control signal the mirror is first accelerated and is then decelerated, but that the final speed of the mirror is not influenced by said control signal.

However, depending on the direction in which the mirror is to be driven this control signal should or should not be inverted. As this depends on which of the two possible maximum deflections the mirror has reached at the instant $t_1$, the state of the two bistables 31 and 32 may be used for this purpose. The control circuit therefore comprises an inverter 44 for inverting the control signal supplied by the adder circuit 43 and two switches 45 and 46 which respectively couple the inverter 44 or the adder circuit 43 to an output terminal 47. The switches 45 and 46 are then controlled by the output of the bistable 32 or 31 respectively, so that depending on the state of these two bistables 31 and 32 one of the two possible control signals is applied to the output terminal 47, which terminal 47 should then be coupled to the drive means of the mirror.

Figure 3:
Figure 3:
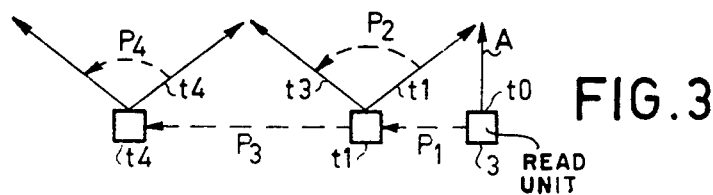

If a deflection element without spring constant is used, it will be necessary to move said element actively, i.e. via a control signal, after the servo control loop has been interrupted, which is then possible via the control circuit shown in FIG. 3. When such a deflection element is used, it is less effective if the servo control loop is closed again under the influence of the speed detector 22, because it is not certain whether upon termination of the control signal the speed of deflection element is zero and because this speed does not decrease any further owing to the absence of the spring force. When such a deflection element is used it is therefore preferable to close the servo control loop immediately upon termination of the control signal on the output terminal 47 and to allow the servo control loop to lock in to a track.

In order to ensure that this locking-in is effected in a reliable manner, the apparatus in accordance with the invention may be extended with a circuit which ensures that the deflection element is braked upon the closure of the servo control loop if after this instant the deflection element has such a speed that the scanning spot would move in a radial direction over several tracks and locking in to one track would not yet be possible. This additional braking circuit is of special importance when a deflection element without spring constant is used, but it also increases the reliability of the apparatus if a deflection element with spring constant is used.

Figure 5:
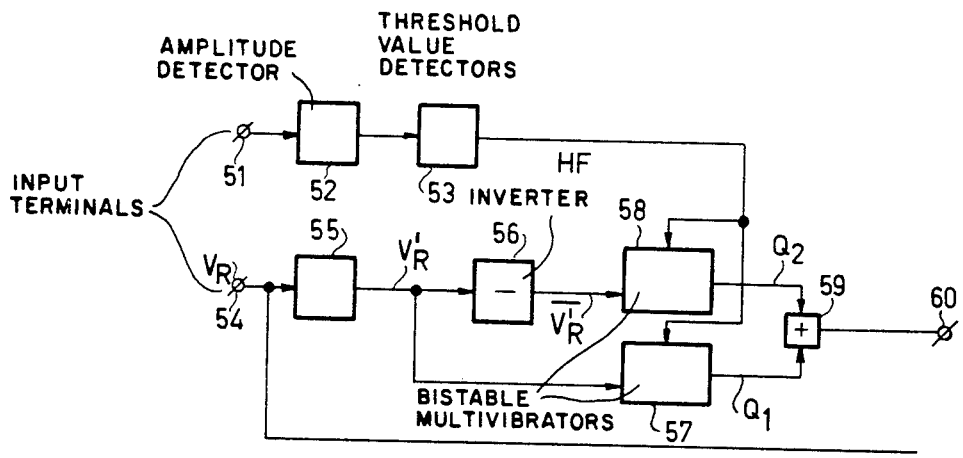
FIG. 5 shows an additional circuit for realising a braking action.
Figure 6:
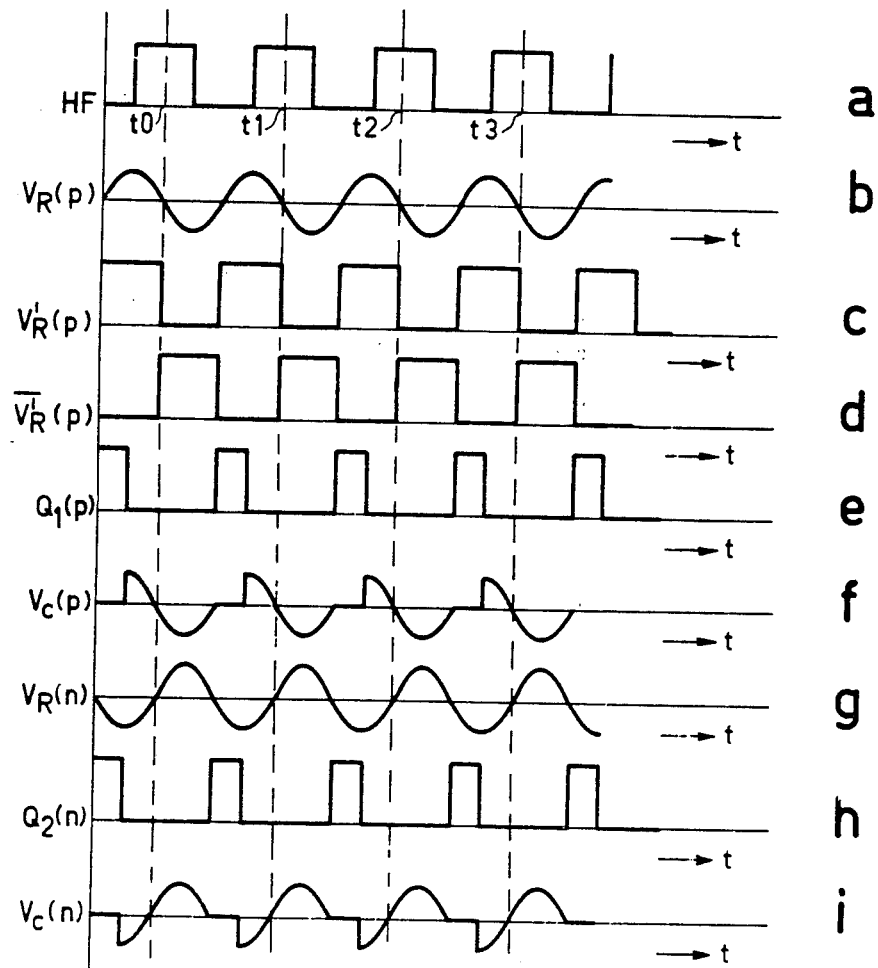
FIG. 6 shows the signals appearing in this circuit.

FIG. 5 shows an embodiment of such a braking circuit and the associated signals are shown in FIG. 6. The circuit of FIG. 5 comprises an input terminal 51 which is connected to the signal terminal 10 (FIG. 1) and to which consequently the signal read from the record carrier is applied. By means of an amplitude detector 52 the amplitude of this signal is measured and is converted into a binary signal by means of a threshold value detector 53. The amplitude of the signal being read is a maximum if the scanning spot is at the center of a track and a minimum if this scanning spot is situated between two tracks. If this scanning spot moves in a radial direction over several tracks, the threshold value detector consequently supplies a signal HF as shown in FIG. 6a, the scanning spot coinciding with a track at the instants $t_0$, $t_1$, $t_2$ and $t_3$.

The circuit furthermore comprises an input terminal 54 to which the measuring signal $V_R$ supplied by the measuring detector 11 is applied. As stated previously, the control signal has a substantially sinusoidal shape when the scanning spot is moved over a number of tracks. The shape of this signal as a function of time also depends on the direction in which the scanning spot is moved. For the two possible radial directions of movement this shape is as shown in FIG. 6b (positive radial movement) and FIG. 6g (negative radial movement).

Said control signal $V_R$ is applied to a threshold value detector 55, so that the signal $V_R$ (p) of FIG. 6b results in a squarewave signal $V_R'(p)$ in accordance with FIG. 6c. This signal $V_R'(p)$ is inverted with an inverter 56, resulting in the signal $\overline{V_R'}(p)$ of FIG. 6d. The signals $V_R'$ and $\overline{V_R'}$ are applied to the clock inputs of two bistables 57 and 58 respectively, while the signal HF is applied to the reset inputs of these bistables. These bistables 57 and 58 supply a positive output signal for a positive-going edge of the signal on their clock inputs when at the same time the signal on the reset input is zero, while said output signal become zero again if the last-mentioned signal on the reset signal becomes positive.

From FIG. 6 it is apparent that the signal HF (FIG. 6a) together with the signal $V_R'(p)$ results in an output signal $Q_1(p)$ on the output of the bistable 57, while the output signal $Q_2$ of bistable 58 remains zero. Via the adder circuit 59 this signal $Q_1(p)$ is applied to a terminal 60. This terminal 60 is coupled to the control circuit for actuating the switch 13 in the servo control loop, the servo control loop being interrupted if the signal of said terminal 60 is positive. Eventually only the corrected control signal $V_c(p)$ is applied to the mirror 6 (FIG. 1) instead of the control signal $V_R(p)$ of FIG. 6b. Comparison of the two control signals $V_R(p)$ and $V_c(p)$ reveals that the average value of the control signal $V_R(p)$ is zero, while that of the control signal $V_c(p)$ is negative. This last-mentioned control signal $V_c(p)$ consequently results in the positive radial movement of the scanning spot being braked.

When it is assumed that there is a negative radial movement of the scanning spot, resulting in a measuring signal $V_R(n)$ of FIG. 6g, it will be evident that the signal $V_R'$ then corresponds to the signal of FIG. 2d and the signal $\overline{V_R'}$ to that of FIG. 2c. This results in an output signal $Q_2(n)$ as shown in FIG. 6h on the output of the flipflop 58 and on the terminal 60. As a result of the interruption of the servo control loop the control signal $V_c(n)$, which is ultimately applied to the drive means for the mirror 6, will have a shape as shown in FIG. 6i. As this control signal has a positive average value, the negative radial movement of the scanning spot is thus reduced thereby.

As both the device of FIG. 4 and that of FIG. 5 control the switch 13, their outputs may be combined, for which purpose for example the terminal 60 (FIG. 5) may be connected to the control terminal 37 of the circuit of FIG. 4 via a diode in forward direction.

Obviously there are also other possibilities of obtaining a direction-dependent braking of the radial movement of the scanning spot. For this reference is for example made to U.S. Pat. No. 4,037,252, which describes a number of possibilities. The presence of this direction-dependent braking circuit not only ensures that, when a desired program section is to be located rapidly, the radial servo control locks into a track after the mirror has performed a movement as described, but it also provides additional stabilization during normal scanning. Indeed, if owing to a disturbance the servo control loop should not be capable of keeping the scanning spot on the track, this circuit at any rate ensures that the resulting deflection of the mirror is braked. The speed detection circuit 22 in FIG. 4, as stated previously, supplies a detection signal as soon as the duration of the negative halfcycle of the signal $V_R'$ exceeds the preset limit value. As especially at the point of reversal of the mirror movement the measuring signal $V_R'$ is non-symmetrical, i.e. has unequal positive and negative halfcycles, it may be useful to extend the speed detection circuit in a manner as indicated by 22' in FIG. 4. This circuit 22' is fully identical to the circuit 22, but via the transistor $T_2$ it receives the inverted signal $V_R'$ and thus supplies a detection signal as soon as the positive halfcycle of the signal $V_R$ exceeds the preset limit value.

What is claimed is:

1. In an apparatus for reading information stored in a record carrier having an optical structure comprised of a plurality of substantially parallel tracks in which the information is stored in optically detectable form, said apparatus including a read unit having means for producing a read beam of radiation, means for detecting the information contained in the read beam radiation after cooperation with the record carrier, and means for varying the position of said read beam in a direction transverse to the track direction, said position varying means including a beam deflecting element movable in opposite directions relative to a center position in response to a control signal, said apparatus further including first means for moving said read unit in a direction normal to the track direction and a servo control loop for controlling the position of said beam in said transverse direction, said control loop including said deflecting element and means for measuring the deviation of said read beam in a direction transverse to the track direction relative to a desired track and for deriving therefrom said control signal, the improvement comprising means for supplying a first signal when the movement of said deflection element in one of said two directions relative to said center position exceeds a predetermined value, means coupled to said suppling means for rendering said servo loop inoperative upon appearance of said first signal, and second means for moving said deflection element in the other of said two directions through said center position upon appearance of said first signal, and second means for rendering said servo loop operative when said deflection element moves past said center position.

2. The apparatus according to claim 1 wherein said second moving means includes spring means arranged so that said deflection element is moved out of said center position against a force exerted by said spring means and including means for detecting the speed of movement of said deflection element which supplies a second signal when said speed of movement decreases below a predetermined value, and wherein said second rendering means renders said servo loop operative upon appearance of said second signal.

3. The apparatus according to claims 1 or 2 wherein said means for supplying said first signal is coupled to said deviation measuring means and includes a threshold detector which produces said first signal when said control signal exceeds a predetermined threshold value.

4. The apparatus according to claim 2 wherein said control signal is an a.c. signal and said speed detecting means measures the frequency of said a.c. control signal and supplies said second signal when said frequency decreases below a predetermined value.

5. The apparatus according to claims 2 or 4 including a delay circuit for activating said speed detecting means after a predetermined time interval after the appearance of said first signal.

6. The apparatus according to claims 1 or 2 wherein said second moving means includes a control circuit for supplying a drive signal in response to which said deflection element is moved upon appearance of said first signal.

7. The apparatus according to claims 1 or 2 including means for braking the movement of said deflection element after the servo loop has been rendered operative.

8. The apparatus according to claim 7 including means for interrupting said servo control loop for at least a part of either a positive or negative half cycle of said measuring signal depending on the direction of movement of the beam.

* * * * *